March 12, 1968 H. L. RICHARDSON 3,372,917
APPARATUS FOR RECOVERY OF CONVERTER OFF-GASES
Filed Aug. 16, 1965 4 Sheets-Sheet 1

HARRY L. RICHARDSON
INVENTOR.

BY *J. T. Claboty*
AGENT

March 12, 1968  H. L. RICHARDSON  3,372,917
APPARATUS FOR RECOVERY OF CONVERTER OFF-GASES
Filed Aug. 16, 1965  4 Sheets-Sheet 2

HARRY L. RICHARDSON
INVENTOR.

BY *J. T. Chabot*
AGENT

March 12, 1968  H. L. RICHARDSON  3,372,917
APPARATUS FOR RECOVERY OF CONVERTER OFF-GASES
Filed Aug. 16, 1965  4 Sheets-Sheet 3

HARRY L. RICHARDSON
INVENTOR.

BY J. T. Chaloupy
AGENT

March 12, 1968  H. L. RICHARDSON  3,372,917
APPARATUS FOR RECOVERY OF CONVERTER OFF-GASES
Filed Aug. 16, 1965  4 Sheets-Sheet 4

HARRY L. RICHARDSON
INVENTOR.

BY *J. T. Chaloty*
AGENT

United States Patent Office 3,372,917
Patented Mar. 12, 1968

3,372,917
APPARATUS FOR RECOVERY OF CONVERTER OFF-GASES
Harry L. Richardson, Pittsburgh, Pa., assignor to Chemical Construction Corporation, New York, N.Y., a corporation of Delaware
Filed Aug. 16, 1965, Ser. No. 479,757
9 Claims. (Cl. 266—15)

ABSTRACT OF THE DISCLOSURE

Combustible off-gas is removed from the mouth of a converter, such as an oxygen steel converter, by inducting a stream of off-gas substantially undiluted with air into a hood disposed with gas inlet opening over the mouth of the converter. A stream of air, mixed with a small amount of off-gas escaping from the spacing between the hood and the converter mouth, is concomitantly withdrawn from about the perimeter of the mouth of the converter and external to the hood, by providing an outer coaxial duct external to the hood. The air stream is inducted through the annular passage between the outer duct and the hood, and the withdrawn air stream or mixture of air with a small amount of off-gas is added to the main off-gas stream through openings in the wall of the hood. Combustion of the off-gas entirely within the hood thus takes place, at a location displaced from the mouth of the converter, and mixing of air with the main off-gas stream at the mouth of the converter is prevented, which effectively avoid combustion of the off-gas at the mouth of the converter and consequent damage to the converter.

---

Figure 1:
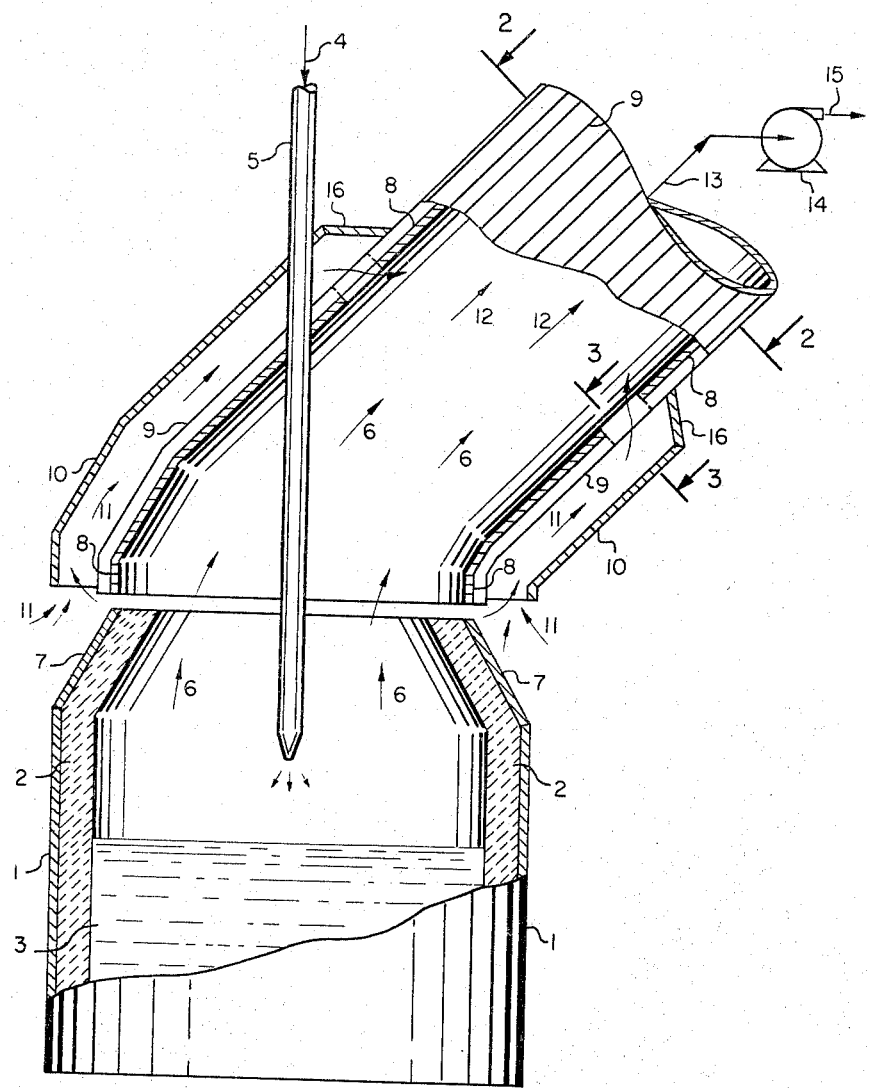

The present invention relates to the recovery of combustible off-gases from furnaces or converters, particularly specialized steel furnaces such as oxygen converters and electric steel furnaces. A method and apparatus has been developed, which permits the removal of combustible off-gases by means of a hood which is disposed over the off-gas outlet of the furnace and spaced away from the outlet. The entry of air between the hood and the furnace outlet, and concomitant combustion of the off-gas at the furnace outlet is effectively prevented in a unique manner.

Numerous types of furnaces and metallurgical facilities generate combustible off-gases. Thus, in the specification and claims infra, reference to a converter will be understood to encompass all of the various types of facilities which generate a combustible off-gas. A preferred application of the present invention is to the specialized oxygen-type steel converter. The conventional procedure in operation of oxygen converters and similar steel furnaces involves a melt purification step, in which gaseous oxygen or oxygen-enriched air is injected into the converter by means of an oxygen lance. The injected oxygen reacts with the pool of molten ferrous metal in the converter, and serves to remove carbon from the molten metal. The resulting converter off-gas, which consists mainly of carbon monoxide at an elevated temperature, is highly combustible.

The off-gas is removed from the converter through an upper outlet known as a mouth, and is inducted into a gas hood disposed over the mouth for eventual discharge or or utilization as fuel gas. The hood surrounds the mouth, however, a spacing is generally provided between the hood and the converter mouth which in the prior art has permitted entry of air into the hood. The oxygen content of this air immediately reacts at the mouth of the converter with the carbon monoxide in the off-gas. As a result of this combustion reaction, a highly elevated temperature is generated at the converter mouth, with adverse effects such as erosion or disintegration of the refractory lining at the converter mouth, which results in eventual converter shutdown for repair of the converter mouth. In actual practice, is has been determined that deterioration of the converter mouth is the major reason for termination of operating campaigns and shutdown for repairs. It has been generally considered necessary in the prior art to induct a certain amount of air into the gas hood for ventilation and combustion purposes, since if no air is inducted some of the off-gas escapes into the atmosphere surrounding the converter, which is highly undesirable due to air pollution, health hazard and the possible formation of an explosive mixture of off-gas and air. Thus, excess air is usually inducted into the hood, and all the carbon monoxide in the off-gas is burned within the hood at the converter mouth. The hood cannot be conveniently attached around the converter mouth by a gas-tight seal because of basic process considerations, since the converter must be tilted after the oxygen purification step to attain removal of the purified molten steel. Typical details of hood arrangements and overall apparatus layouts are shown in U.S. Patents Nos. 3,002,739, 2,908,737, 2,862,701, 2,847,206 and 2,803,450.

In the present invention, combustible off-gas is recovered from the mouth of a converter in a unique manner. A stream of off-gas substantially undiluted with air is inducted into a hood disposed with a gas inlet opening over the mouth of the converter. A stream of air, usually mixed with a small amount of off-gas escaping from the spacing between the hood and the converter mouth, is concomitantly withdrawn from about the perimeter of the mouth of the converter external to the hood. In this manner, mixing of air with the main off-gas stream passing into the hood from the mouth of the converter is effectively prevented, and consequently combustion of the main off-gas stream at the mouth of the converter is eliminated. The withdrawn air stream or mixture of air with a small amount of off-gas is preferably added to the main off-gas stream in the hood, with consequent combustion of the off-gas entirely within the hood. The preferred apparatus for carrying out this sequence consists of a hood which is disposed over the converter mouth, combined with means for inducting off-gas undiluted with air into the hood, with the hood being disposed within an outer duct which terminates adjacent to the perimeter of the mouth of the converter. Means are provided to induct a second stream of off-gas mixed with air from about the perimeter of the mouth of the converter into the annular passage between the hood and the outer duct, and the mixing of air with the main off-gas stream at the mouth of the converter which would result in combustion of off-gas at the mouth of the converter is effectively prevented. In a preferred embodiment, a plurality of openings are provided in the wall of the hood, and the outer duct is attached to the hood by a fluid-impervious attachment adjacent to the openings. In this arrangement, the second stream of off-gas mixed with air passes from the annular passage between the hood and the outer duct into the hood itself, and combustion of the main off-gas stream takes place within the hood, at a location displaced from the mouth of the converter.

A principal advantage of the method and apparatus of the present invention is that combustion of converter off-gas at the mouth of the converter is effectively prevented, and thus deterioration of the converter mouth due to exposure to highly elevated temperatures and flames is avoided. Another advantage is that off-gas is withdrawn from the converter mouth into the hood in a substantially undiluted state, and thus may be subsequently employed as a fuel source or for other purposes. In the case of an oxygen-type steel converter, the undiluted off-gas essentially consists of carbon monoxide, which may be employed as a fuel gas in a steam boiler or other usage, or alternatively the carbon monoxide-containing off-gas may be employed as a raw material for chemical synthesis. Thus, steam could be added to the carbon monoxide-rich off-gas, with the resulting gas mixture being subjected to the catalytic CO-oxidation shift reaction to produce a gas mixture of hydrogen and carbon dioxide. Scrubbing of the gas mixture with aqueous potassium carbonate solution, monoethanolamine solution, or similar solvents for carbon dioxide, will yield a final hydrogen gas stream which may be employed in the synthesis of ammonia.

Another advantage of the present invention arises in cases where it is desired to burn the combustible off-gas prior to discharge to atmosphere. In this case, the air or mixture of air and off-gas which is withdrawn from about the perimeter of the mouth of the converter is added to the main off-gas stream within the hood. Combustion of the off-gas stream thus takes place within the hood, and highly elevated temperatures are generated. It is apparent that eventual deterioration of sections of the hood will take place, even when the hood is externally cooled with a water jacket. However, it is much less costly and simpler to replace or repair a hood section than it is to repair the refractory-lined mouth of the converter, and in addition the time interval for repair is less and hence the on-stream operating cycle of the facility is improved.

It is an object of the present invention to remove combustible off-gas from the mouth of a converter in an improved manner.

Another object is to remove combustible off-gas from the mouth of a converter while preventing dilution with air.

A further object is to provide an improved method and apparatus for the removal of combustible off-gas from the mouth of a converter.

An additional object is to prevent combustion of combustible off-gas at the mouth of a converter.

Still another object is to provide an improved hood arrangement for the removal of combustible off-gas from the mouth of a converter.

Still a further object is to provide a method and apparatus for withdrawing a stream of air from about the perimeter of the mouth of a converter, thereby preventing entry of air into the main stream of off-gas being discharged from the mouth of the converter.

These and other objects and advantages of the present invention will become evident from the description of the method and apparatus of the present invention which follows. Referring to the figures, FIGURE 1 is an overall elevation view of the apparatus of the present invention, showing a preferred embodiment of the application of the method and apparatus to an oxygen-type steel converter.

Figure 2:
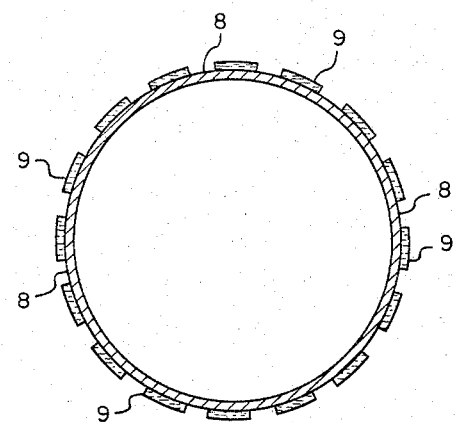
Figure 3:
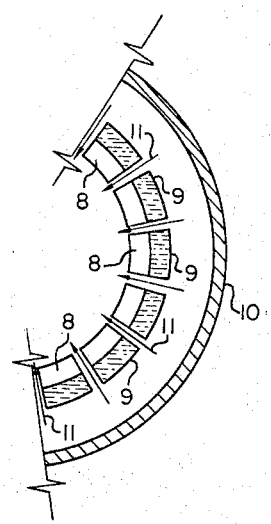
Figure 4:
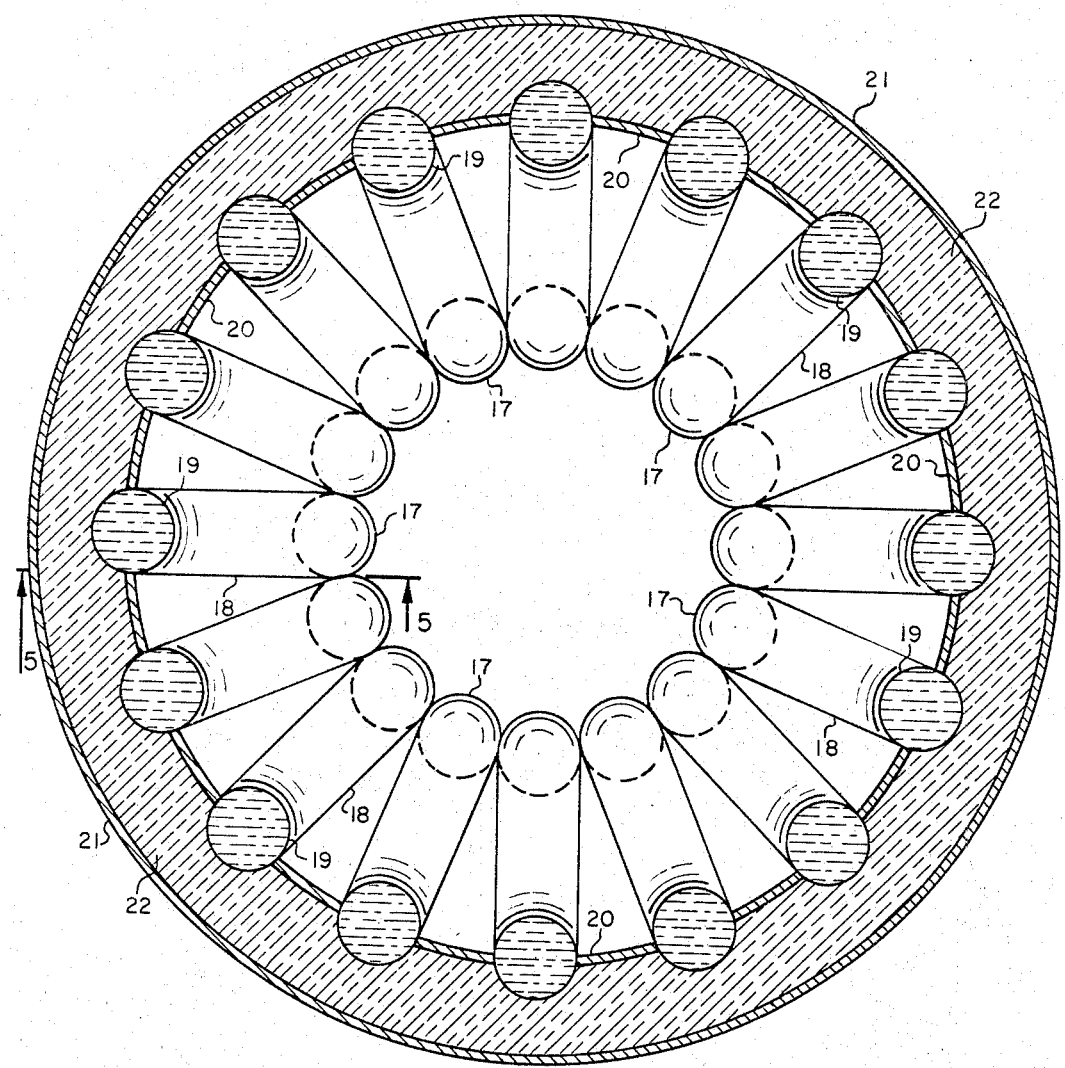
Figure 5:
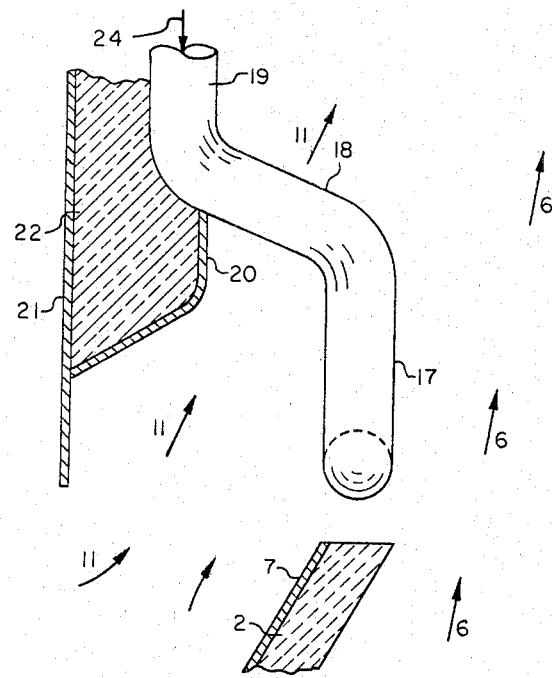
Figure 6:
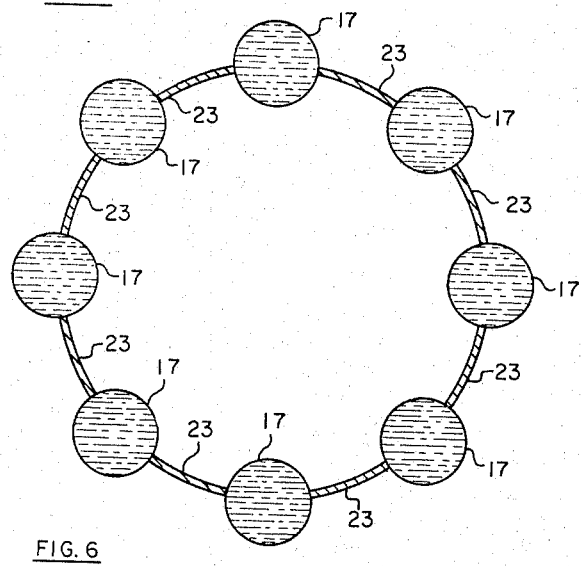

FIGURE 2 is a sectional plan view of FIGURE 1, taken on section 2—2 and showing the preferred arrangement of the water cooling conduits on the outer surface of the hood, FIGURE 3 is a sectional plan view of a portion of FIGURE 1, taken on section 3—3 and showing the entry ports or openings for passage of air from the annular space between the hood and the outer duct into the hood, FIGURE 4 is a plan view of an alternative embodiment and apparatus arrangement of the invention, in which the water cooling conduits or tubes serve to define the hood wall and also provide internal cooling of the hood during combustion of the off-gas, FIGURE 5 is a sectional elevation view of FIGURE 4, taken on section 5—5, And FIGURE 6 illustrates an alternative embodiment of the lower section of the hood arrangement shown in FIGURE 4.

Referring to FIGURE 1, oxygen-type steel converter 1 is a vertically oriented cylindrical container provided with inner refractory lining 2 and holding liquid pool 3 consisting of molten ferrous metal. A gaseous stream 4 consisting of air, oxygen or oxygen-enriched air is passed via oxygen lance 5 into converter 1, and is discharged into the molten ferrous metal pool 3. A reaction takes place between the oxygen and the ferrous metal, and the resulting combustible off-gas stream 6 principally containing carbon monoxide is generated within converter 1 at an elevated temperature typically in the range of 2500° F. to 3100° F. Stream 6 rises through the upper mouth of converter 1 defined by nose cone 7, and is inducted into the generally vertically oriented cylindrical hood 8 which is disposed over the mouth of the converter. Hood 8 is preferably externally cooled by passing water through external conduits 9 which are attached to the outer surface of hood 8.

Hood 8 is disposed within outer duct 10, which is of generally cylindrical configuration and is essentially coaxial with hood 8. Duct 10 terminates adjacent to the perimeter of the mouth of converter 1, and an air stream 11 is inducted from the vicinity of the perimeter of the mouth of converter 1 into the annular passage between hood 8 and duct 10, thus preventing air entry into the combustible off-gas stream 6 at the mouth of the converter 1. In this manner, combustion of the off-gas stream 6 at the mouth of the converter 1 and concomitant deterioration of the nose cone 7 and refractory lining 2 is effectively prevented. A small amount of off-gas usually escapes from between nose cone 7 and hood 8, and is also inducted into the annular passage between hood 8 and duct 10, and is thus mixed with air stream 11.

The air stream 11, together with a small amount of off-gas, flows upwards in the annular passage between hood 8 and duct 10 and then flows into hood 8 through ports or openings in the wall of hood 8, passing between conduits 9. Duct 10 is attached to hood 8 by a fluid-impervious attachment such as closure baffle 16, disposed above and adjacent to the openings in hood 8. The air stream 11 enters hood 8 and mixes with the combustible off-gas stream 6 at a region in the hood 8 which is displaced from the mouth of converter 1, and combustion of the off-gas stream 6 thus takes place within hood 8. The resulting gas stream 12 after combustion will be at a highly elevated temperature, typically in the range of 3500° F. to 4500° F., and may be quench-cooled by water sprays, not shown, or by means of the apparatus disclosed in U.S. Patent Application Ser. No. 251,123 filed Jan. 14, 1963, now U.S. Patent No. 3,212,761. In any case, the resulting gas stream is withdrawn from hood 8 via stream 13, and passes through blower 14 which thus serves to induct both streams 6 and 11 into the apparatus. The gas stream 15 discharged from blower 14 is passed to a stack, not shown, or other atmospheric discharge means.

Referring now to FIGURE 2, a sectional plan view of the hood 8 and external conduits 9 holding cooling water is shown. The cooling water will generally be circulated through conduits 9 so as to effectively cool the duct 8, and warmed cooling water will usually be passed through an external atmospheric cooling tower and recycled.

FIGURE 3 illustrates the preferred arrangement for attaining entry of air stream 11 containing a small amount of off-gas from the annular passage between hood 8 and duct 10 into hood 8 for combustion of the off-gas stream 6. Stream 11 flows inwards between the spaced apart conduits 9, and through ports or openings in the wall of hood 8.

Referring now to FIGURE 4, the lower sections 17 of the circular water cooling conduits or tubes are juxtaposed so as to define a circular hood passage through which the off-gas rises from the mouth of the converter. Water cooling tube sections 18 extend inwardly from the upper sections 19 of the water cooling tubes and connect with sections 17, thus serving to provide a continuous passage for the flow of cooling water through the tubes. The tube sections 19 are mounted in the inner circular duct 20, and sections 19 may either be disposed between sections of duct 20 as shown or alternatively duct 20 may be continuous and water tube sections 19 may be tangentially attached to the wall of duct 20, in which case duct 20 will be continuous and the tube sections 19 will be mounted on the inner surface of duct 20. A coaxial outer duct 21 is provided external to duct 20, with insulation 22 which may consist of a refractory material being provided in the annular space between ducts 20 and 21. The inducted air rises through the triangular openings defined between adjacent sections 18 and a section of duct 20, and thus joins the off-gas stream rising through the circular central hood passage defined by sections 17.

FIGURE 5 is a vertical sectional view showing the arrangement of tube sections 17 and outer duct 21 relative to the mouth of the converter defined by nose cone 7 and refractory lining 2, and the flow of off-gas stream 6 as well as inducted air stream 11. Stream 11 is inducted upwards between duct 21 and tube sections 17 and flows upwards through the triangular openings between sections 18, thereafter mixing with off-gas stream 6. Water stream 24 is passed into tube section 19, thereafter flowing continously through tube sections 18 and 17.

An added advantage is derived from the arrangement shown in FIGURES 4 and 5, because combustion air stream 11 tends to encapsulate the off-gas stream 6 in such a manner that the ignition zone is at the interface between the air and the column of off-gas 6, thus forming a pattern of an elongated cone. The air openings, shown in FIG. 4 and defined between adjacent sections 18 and sections 20, utilize this phenomenon in the maximum possible manner by introducing the air through a circle of annular triangle whose bases are sections 20.

Referring now to FIG. 6, the tube sections 17 may alternatively be spaced apart in which case a continuous hood passage for off-gas flow is attained by providing baffle sections 23 which extend between adjacent tube sections 17.

Another alternative arrangement of the apparatus of FIGURES 4 and 5, not shown, would entail the omission of insulation 22 and inner duct 20, in which case the tube sections 19 would be attached to outer duct 21. The provision of insulation 22 and inner duct 20 is a preferable embodiment of the invention, since in this case the apparatus is suitable for the efficient generation of usable steam by the vaporization of water within tube sections 17, 18 and 19.

Numerous alternatives within the scope of the present invention will occur to those skilled in the art. Thus, in some cases the combustible off-gas stream 6 will be employed as a fuel or for chemical synthesis as mentioned supra. In this case, combustion of stream 6 is to be avoided, and air stream 11 will not be added to the main off-gas stream in hood 8, but will be separately inducted or withdrawn from the annular perimeter about the mouth of the converter 1 and subsequently discharged from the converter environment. As discussed supra, in most cases stream 11 will contain a small amount of off-gas derived from the spacing between nose cone 7 and hood 8, however it is possible with precise control of relative pressure levels to withdraw or induct stream 11 substantially free of off-gas and contain all of the off-gas stream 6 within hood 8.

The method and apparatus of the present invention is applicable to a wide variety of converters, furnaces, metallurgical installation, or any type of facility which generates a combustible off-gas. Thus, in some cases the conduits 9 provided for the external cooling of hood 8 with circulating water may be omitted, and in other cases a double-walled hood may be provided with water circulation between the hood walls, for cooling, or a continuous external water jacket may be provided for hood cooling, as illustrated in U.S. Patent No. 3,186,831. It is evident that other means for gas induction may be provided instead of blower 14, thus in some cases a fan or fans may be disposed within hood 8 to induce movement of the off-gas through hood 8. The mouth of the converter 1 may be square, rectangular or oval-shaped in some cases, and in these cases the hood 8 will be of a suitable configuration to accommodate the mouth of the converter. Thus, in some cases the hood 8 may be of a truncated pyramidal shape, terminating at an upper outlet connected to a gas duct of relatively small cross-sectional area. The hood 8 and outer duct 10 may be internally lined with a suitable ceramic or refractory lining, to prevent or retard deterioration due to exposure to elevated gas temperature. Finally, the water circulating in conduits 9 or tubes sections 17, 18 and 19 may be condensate or boiler feed water, and the water flow may be arranged so as to attain the generation of usable steam within the conduits 9 or tube sections 17, 18 and 19.

I claim:

1. An apparatus for recovering combustible converter off-gas from the mouth of a converter which comprises a converter, said converter having an upper mouth opening, an off-gas removal hood terminating in close proximity to the mouth of said converter, said hood having a terminal gas inlet opening over the mouth of said converter, means to induct a first stream of off-gas substantially undiluted with air from said converter into said hood through said gas inlet opening, said hood being disposed within an outer duct, said outer duct terminating adjacent to the perimeter of the mouth of said converter, means to induct a second stream of off-gas mixed with air from about the perimeter of the mouth of said converter into the annular passage between said hood and said outer duct, whereby the mixing of air with said first off-gas stream and combustion of said first off-gas stream at the mouth of said converter is substantially prevented, and means to pass the second stream of off-gas mixed with air from the annular passage between said hood and said outer duct into said hood, whereby combustion of said first off-gas stream takes places within said hood.

2. The apparatus of claim 1, in which said means to pass the second stream of off-gas mixed with air from the annular passage between said hood and said outer duct into said hood comprises an opening in the wall of said hood, said outer duct being connected to said hood with a fluid-impervious attachment adjacent to said opening.

3. An apparatus for recovering combustible converter off-gas from the mouth of a converter which comprises a converter, said converter having a circular upper mouth opening, a vertically oriented cylindrical off-gas removal hood terminating in close proximity to the mouth of said converter, said hood having a circular terminal gas inlet opening over the mouth of said converter, means to externally cool said hood, means to induct a first stream of off-gas substantially undiluted with air from said converter into said hood through said gas inlet opening, said hood being disposed within a cylindrical coaxial outer duct, said outer duct terminating adjacent to the perimeter of the mouth of said converter, means to induct a second stream of off-gas mixed with air from about the perimeter of the mouth of said converter into the annular passage between said hood and said outer duct, whereby the mixing of air with said first off-gas stream and combustion of said first off-gas stream at the mouth of said converter is substantially prevented, a plurality of openings in the wall of said hood, said plurality of openings being spaced away from said terminal gas inlet opening and opposite to said outer duct, whereby said second stream of off-gas mixed with air passes from the annular passage between said hood and said outer duct into said hood through said openings, and whereby combustion of said first off-gas stream takes place within said hood, said outer duct being connected to said hood with a fluid-impervious attachment adjacent to said plurality of openings.

4. The apparatus of claim 3, in which said means to externally cool said hood comprises a plurality of conduits mounted on the outer surface of said hood, together with means to pass cooling water through said conduits.

5. An apparatus for recovering combustible converter off-gas from the mouth of an oxygen-type steel converter which comprises a converter, said converter having an upper mouth opening and holding a pool of molten ferrous metal, an oxygen lance extending into said converter through said mouth, means to pass a gaseous stream principally comprising oxygen through said lance and into said converter, whereby oxygen reacts with said pool of molten ferrous metal and an off-gas principally comprising carbon monoxide is generated, an off-gas removal hood terminating in close proximity to the mouth of said converter, said hood having a terminal gas inlet opening over the mouth of said converter, a plurality of conduits mounted on the outer surface of said hood, means to pass cooling water through said conduits whereby said hood is externally cooled, means to induct a first stream of off-gas substantially undiluted with air from said converter into said hood through said gas inlet opening, said hood being disposed within an outer duct, said outer duct terminating adjacent to the perimeter of the mouth of said converter, means to induct a second stream of off-gas mixed with air from about the perimeter of the mouth of said converter into the annular passage between said hood and said outer duct, whereby the mixing of air with said first off-gas stream and combustion of said first off-gas stream at the mouth of said converter is substantially prevented, and a plurality of openings in the wall of said hood, said plurality of openings being spaced away from said terminal gas inlet opening and opposite to said outer duct, whereby said second stream of off-gas mixed with air passes from the annular passage between said hood and said outer duct into said hood through said openings, and whereby combustion of said first off-gas stream takes place within said hood, said outer duct being connected to said hood with a fluid-impervious attachment adjacent to said plurality of openings.

6. An apparatus for recovering combustible converter off-gas from the mouth of a converter which comprises a converter, said converter having an upper mouth opening, a substantially vertical duct disposed above said mouth opening, said duct terminating with an inlet opening adjacent to the outer perimeter of said mouth opening, the wall of said duct at said inlet opening being external to and spaced away from said mouth opening, a plurality of vertically oriented water tubes, the upper sections of said water tubes being spaced apart and attached to the inner wall of said duct, said water tubes extending inwardly from the lower ends of said upper sections to vertically oriented lower sections which extend downwardly and are juxtaposed thereby defining an off-gas inlet hood over said mouth opening, means to pass water through said water tubes, and means to induct gas into said duct, whereby off-gas discharged from said mouth opening is inducted into the hood defined by the juxtaposed lower sections of said cooling tubes, an air stream is inducted from about the perimeter of said mouth opening into the annular passage between the juxtaposed lower sections of said cooling tubes and said duct, and said off-gas and said air stream are mixed within said duct.

7. An apparatus for recovering combustible converter off-gas from the mouth of a converter which comprises a converter, said converter having an upper mouth opening, a substantially vertical outer duct disposed above said mouth opening, said outer duct terminating with an inlet opening adjacent to the outer perimeter of said mouth opening, the wall of said outer duct at said inlet opening being external to and spaced away from said mouth opening, a substantially vertical inner duct within said outer duct, a bed of insulation disposed in the annular space between said inner duct and said outer duct, a plurality of vertically oriented water tubes, the upper sections of said water tubes being spaced apart and attached to the inner wall of said inner duct, said water tubes extending inwardly from the lower ends of said upper sections to vertically oriented lower sections which extend downwardly and are juxtaposed thereby defining an off-gas inlet hood over said mouth opening, means to pass water through said water tubes, and means to induct gas into said inner duct, whereby off-gas discharged from said mouth opening is inducted into the hood defined by the juxtaposed lower sections of said cooling tubes, an air stream is inducted from about the perimeter of said mouth opening into the annular passage between the juxtaposed lower sections of said cooling tubes and said outer duct, and said off-gas and said air stream are mixed within said duct.

8. The apparatus of claim 7, in which the juxtaposed lower sections of said cooling tubes are joined by baffle sections which extend between adjacent cooling tube sections.

9. The apparatus of claim 7, in which said water passing through said cooling tubes is at least partially vaporized, whereby steam is produced in said water tubes, and means are provided to remove said steam from said water tubes for external utilization.

References Cited

UNITED STATES PATENTS

| | | | |
|---|---|---|---|
| 3,154,406 | 10/1964 | Allard | 266—35 |
| 3,177,065 | 4/1965 | Okaniwa et al. | 266—35 |
| 3,186,831 | 6/1965 | Pike | 98—115 |
| 3,194,651 | 7/1965 | Namy et al. | 266—35 |
| 3,215,425 | 11/1965 | Vogt | 266—35 |
| 3,205,810 | 9/1965 | Rosenak | 266—35 |
| 3,269,176 | 8/1966 | Walker | 266—35 |
| 3,313,229 | 4/1967 | Muller | 98—115 |

J. SPENCER OVERHOLSER, *Primary Examiner.*

WILLIAM J. STEPHENSON, *Examiner.*

R. S. ANNEAR, *Assistant Examiner.*